（12) United States Patent
Allen et al.

(10) Patent No.: US 11,452,896 B1
(45) Date of Patent: Sep. 27, 2022

(54) FIRE FIGHTING AGENT COMPOSITIONS

(71) Applicant: Fire Suppression Innovations, Charlotte, NC (US)

(72) Inventors: Benjamin Allen, Charlotte, NC (US); Daniel Bowen, Phoneix, AZ (US); Brandon Miller, Chico, CA (US)

(*) Notice: Subject to any disclaimer, the term of this patent is extended or adjusted under 35 U.S.C. 154(b) by 0 days.

(21) Appl. No.: 17/218,712

(22) Filed: Mar. 31, 2021

Related U.S. Application Data

(60) Provisional application No. 63/003,345, filed on Apr. 1, 2020.

(51) Int. Cl.
*A62D 1/00* (2006.01)
*A62D 1/02* (2006.01)
*C09K 21/14* (2006.01)

(52) U.S. Cl.
CPC ......... *A62D 1/0042* (2013.01); *A62D 1/0071* (2013.01); *C09K 21/14* (2013.01)

(58) Field of Classification Search
None
See application file for complete search history.

(56) References Cited

U.S. PATENT DOCUMENTS

| | | | | |
|---|---|---|---|---|
| 9,675,828 | B1* | 6/2017 | Sery | C08L 5/00 |
| 2003/0010507 | A1* | 1/2003 | Greiner | A62D 1/0078 |
| | | | | 169/44 |
| 2005/0217537 | A1* | 10/2005 | Knipe | C08K 3/38 |
| | | | | 106/493 |
| 2007/0241306 | A1* | 10/2007 | Wehner | A61Q 15/00 |
| | | | | 252/67 |
| 2008/0031907 | A1* | 2/2008 | Tamarkin | A61K 31/137 |
| | | | | 424/401 |
| 2013/0220646 | A1* | 8/2013 | Aldredge | A62D 1/0042 |
| | | | | 169/46 |
| 2017/0056698 | A1* | 3/2017 | Pai | A62D 1/0042 |
| 2018/0043190 | A1* | 2/2018 | Myers | A61K 8/416 |
| 2018/0119339 | A1* | 5/2018 | Mashburn | D06N 7/0073 |
| 2019/0360160 | A1* | 11/2019 | Mashburn | A41G 1/009 |
| 2020/0061865 | A1* | 2/2020 | Freeman | C09K 21/00 |
| 2020/0121584 | A1* | 4/2020 | Coleman | A61K 8/062 |

* cited by examiner

*Primary Examiner* — Joseph D Anthony
(74) *Attorney, Agent, or Firm* — Trego, Hines & Ladenheim, PLLC; Jonathan M. Hines

(57) ABSTRACT

A composition for a food safe firefighting agent includes: xanthan gum, water, and a surfactant.

26 Claims, No Drawings

FIRE FIGHTING AGENT COMPOSITIONS

BACKGROUND OF THE INVENTION

This invention relates generally to fire fighting and more particularly to compositions for use as fire suppressants and retardants.

The "fire triangle" refers to three elements required to support combustion, namely: (1) fuel, (2) oxygen, and (3) a heat source. Firefighting agents such as suppressants and retardants act to reduce or remove one or more elements of the fire triangle.

One common firefighting agent, because of its abundance and easy handling, is water. It is also known to enhance the effectiveness of water using additives such as surfactants, heavy alcohols, or boron compounds.

Most of the current commercially available fire suppressants and foams contain chemicals that are either acutely toxic to humans, cause cancer with long-term exposure, are damaging to the environment, or some combination of the above.

Past attempts to create safer firefighting agents have encountered various obstacles, including: the fact that non-fluoroprotein based foaming agents have difficulty producing a robust enough foam to be used against high temperature class B fires; the relatively low solubility of either borax or boric acid alone; the tendency of non-fluoroprotein based surfactants to solidify in cold weather; the tendency of most environmentally friendly products to quickly biodegrade; or the tendency of many such products to separate and stratify with time.

Accordingly, there remains a need for fire suppressants and retardants that are safer and more environmentally friendly.

BRIEF SUMMARY OF THE INVENTION

This need is addressed by firefighting agent compositions which are food safe.

DETAILED DESCRIPTION OF THE INVENTION

Disclosed herein are compositions which have utility as suppressants, which typically depend on their water content to fight fires, and/or retardants, which alter a fire's burning characteristics independently of any water content. The compositions used herein are generically referred to as "firefighting" compositions.

Several example compositions are set forth in detail below. It will be understood that all of these compositions have at least some utility as firefighting agents for any type of fire in classes A, B, C, D, or K, as well as possibly other types of fires. Some of the compositions are described as being effective "for use in" certain classes or types of fires. This refers to those compositions being particularly suitable in those applications because of their firefighting effectiveness and/or lack of undesirable side effects and/or economy of use. Such description is not intended to mean that a particular example is not suitable or useful for a different class or type of fire.

Example 1. Firefighting agent for use in class A and miscellaneous fires: The exemplary composition shown in Table 1 below has been demonstrated to be particularly effective to fight class A and other miscellaneous fires. A common application of the firefighting agent in this use category is in extinguishers, hand-pressurized sprayers, and backpack sprayers. This agent can be used full strength or diluted with water. Many fire engines have eductor systems that will draw a set percentage of agent into a water stream. The ratio of agent to water can vary, but the most common preset is about 3% agent to about 97% water. The firefighting agent has been used effectively in various eductor systems and sprayers from as little as about 1% agent to as high as about 100% agent. As used herein, terms of approximation such as "approximately" and "about", when used to describe quantitative terms, encompass the stated values as well as a tolerance for variations in manufacturing processes and/or measurement equipment that do not materially change the functional characteristics of the composition. If not otherwise stated, quantitative values set forth herein may be assumed to encompass the stated values, plus or minus 1% of the stated values.

TABLE 1

Firefighting agent composition most often used against Class A and other miscellaneous fires.

| wt.% | component |
| --- | --- |
| 0.30-0.35 | xanthan gum |
| 2.83-3.53 | boric acid |
| 4.34-5.48 | borax (10 mol) |
| 10.00 | propylene glycol |
| 76.14-77.90 | water |
| 1.56-2.00 | ammonium lauryl sulfate |
| 1.92-2.40 | decyl glucoside |
| 0.15-0.74 | citric acid |

The xanthan gum acts to create a shear thinning effect. This effect allows the agent to maintain a low viscosity when under high shear (for example, passing through hoses and nozzles) while at the same time increasing the viscosity of the agent when it lands on its target material. This allows for the agent to better adhere to vertical and even overhead surfaces, as well as form a more durable film over the surface of the target material. Additionally, the shear thinning properties facilitate the formation of a more robust and durable foam to prevent oxygen from reaching the fuel surface. Xanthan gum was chosen as the preferred shear thinning agent in part because it is widely recognized as completely safe, non-toxic, and able to be used in food products. Alternatively, other shear thinning agents could be used in the place of xanthan gum. The amount of shear thinning agent in the mixture can vary tremendously and still accomplish a similar effect. For example, as little as about 0.01% xanthan gum can impart noticeable shear thinning properties to a fluid mixture and mixtures with as high as about 1% xanthan gum can still be usable.

The boron content of the agent helps to suppress and retard fires through various pathways. One pathway is the promotion of char formation which insulates other combustible material while stifling the emission of combustible gasses. Another proposed pathway is the absorption of free radicals. This will stifle the propagation of combustion even when all three legs of the fire triangle are present.

Boric acid and boron mutually enhance one another's solubility. Together they create a far higher total dissolved boron content than would either one of them alone. Other boron containing products such as POLYBOR available from U.S. Borax, Boron, Calif. 93516 USA could be used to similar effect. The reason that a boric acid and borax mixture were chosen as the preferred embodiment for use in the agent is largely due to two factors. This first factor is the ready availability and low cost of these ingredients. The second factor is the widely recognized safety and familiarity of these products. Both borax and boric acid have been used in the food and agricultural industry for many years. Additionally, they are both naturally occurring minerals and as such are allowable to be listed in an Organic Materials Research Institute (OMRI) certification. The ratio of borax to boric acid could vary significantly while still accomplishing the function described herein. In this embodiment the molar ratio of boric acid to borax is approximately 4:1. Ratios ranging from about 1:1 to about 10:1, all showed at least some efficacy in testing. Ratios between about 3:1 and about 6:1 seemed to offer the highest solubility. Additionally, while this particular embodiment uses 10 mol borax, (also known as borax decahydrate), borax pentahydrate (5 mol borax) or other similar permutations could be used instead. Finally, the total quantity of Borates can vary tremendously. As little as about 1% total borate compounds in the agent provides very significant retardant and suppressant capabilities. The agent can be mixed with as high as about 30% total dissolved borate compounds and work well as a retardant and suppressant.

The propylene glycol serves several purposes. The most important of which, is to prevent the formation of a vapor barrier. The vapor barrier is a phenomenon in which water is prevented from fully contacting a hot surface due a layer of water vapor that forms between the water and the surface. Due to propylene glycol's high boiling point, it helps to break through the vapor barrier and allow the agent to fully contact the target surface. This greatly enhances the cooling effect of the agent. The propylene glycol also allows the agent to form a more robust foam further blocking oxygen from reaching the target surface. While this particular embodiment uses 10% propylene glycol, as little as about 1% propylene glycol and as much as about 50% propylene glycol can also be used to similar effect. Additionally, although we have elected to use propylene glycol for this particular blend, glycerol (glycerin), sorbitol, or other sugar alcohols may be used to similar effect.

The ammonium lauryl sulfate (ALS) and decyl glucoside (DG) are used as a combination of surfactants to accomplish two main purposes. The first is to create foam. Foam functions better than water alone to prevent oxygen from reaching the surface of the material. Additionally, in the event that there are burning liquids, the foam will float on top of these burning liquids thus preventing oxygen from reaching the surface. The second purpose of the surfactant blend is to serve as a wetting agent. A wetting agent allows the fluid mixture to have better contact with the target surface and better penetrate and soak porous surfaces. This has a powerful fire suppression effect as it better cools surfaces as well as blocks oxygen from reaching the surface. In this particular embodiment the surfactants that were chosen were ammonium laurel sulfate and decyl glucoside at a specific ratio to one another. We have found this ratio and concentration of surfactants to be effective at producing a robust foam, and avoid solidifying at low temperatures. Additionally, these surfactants were chosen due to their very low toxicity and low biological irritation potential. While these surfactants do not have the same foam producing capacity as protein and fluoro-protein foams, they were chosen due to their widely recognized track record of safety.

This ratio between ALS and DG could be changed significantly, or the total surfactant content could be changed significantly and still produce the desired effect. For example, the combined surfactant quantity may range from just over 1% to nearly 10%. The quantity of surfactants could be increased to 50% or even more and still effectively accomplish their purposes; especially when used in a situation where product is being drawn into an education system. In many applications, especially ones in which the product is not further diluted with water, surfactant quantities could be as low as about 0.1% or less and still provide wetting capacity and product foam. Additionally, the type of surfactant used can changed and still produce the desired effect. For example, sodium lauryl sulfate, potassium lauryl sulfate, sodium palmate, potassium palmate, etc. could easily be substituted for ALS or DG.

Lastly, the addition of citric acid to the product mixture, is not necessary for the product to function well as a suppressant or a retardant. However, citric acid helps to bring the total pH of the agent closer to neutral. Other acids or pH buffers could be chosen, but citric acid was used as the preferred embodiment due to its safety, and low cost. The amount of citric acid added is typically proportional to the amount of surfactants used in the formulation as they are the main contributors to alkalinity.

Example 2. Firefighting Agent for use in class B Fires and AFFF applications: The exemplary composition shown in Table 2 below has been demonstrated to be particularly effective to fight Class B fires. The agent can be used undiluted or mixed with water. Many fire engines have eductor systems that will draw a set percentage of a fire suppressing agent into a water stream. These eductor systems are typically set to draw about 3% suppressing agent into a water stream. The exemplary agent below (table 2) has been used effectively in eductor systems and sprayers from as little as about 1% agent to as high about 100% agent.

TABLE 2

Firefighting agent most often used against Class B fires.

| wt.% | component |
| --- | --- |
| 0.36-0.45 | xanthan gum |
| 0.00-2.15 | boric acid |
| 0.00-3.24 | borax (10 mol) |
| 10.00 | propylene glycol |
| 71.33-79.86 | water |
| 4.03-8.06 | ammonium lauryl sulfate |
| 5.03-10.06 | decyl glucoside |
| 0.10-1.92 | citric acid |

In Class B fires, where the target material is a burning liquid, the formation of a robust and durable foam is the key factor in extinguishing the fire. If the foam breaks down into a non-aerated liquid, the greater density of this liquid will cause it to sink below the surface of the burning fuel, this in turn allows the fuel to continue producing flammable gasses and be exposed to oxygen.

In this particular embodiment, the xanthan gum, propylene glycol, and surfactants facilitate the formation of a more robust and durable foam to prevent oxygen from reaching the fuel surface.

Example 3. Firefighting agent for use in in plumbing and soldering applications: The exemplary composition shown in Table 3 below has been demonstrated to be particularly effective for firefighting and fire prevention in plumbing and soldering applications.

TABLE 3

Firefighting agent for plumbing and soldering applications.

| wt.% | component |
|---|---|
| 0.09 | Xanthan Gum |
| 1.67 | Boric Acid |
| 2.55 | Borax (10 mol) |
| 3.75 | Propylene Glycol |
| 89.22-89.49 | Water |
| 0.90 | Ammonium Lauryl Sulfate |
| 1.35 | Decyl Glucoside |
| 0.20-0.47 | Citric Acid |

When soldering copper pipes, plumbers often face the dilemma of using a torch in close proximity with combustible materials. Not only does this create a hazardous situation, potentially starting an uncontrolled fire, but also risks localized damage to heat sensitive materials near the soldering site. In an exemplary embodiment, firefighting agent disclosed herein is put into a small hand pump spray bottle and kept in close proximity to the worker. In this application, it can serve several purposes, as follows:

1) It can be sprayed directly onto any fires that have started near the soldering site providing immediate suppression and extinguishment of any small fires. This is much preferable to discharging an ordinary fire extinguisher which is both costly and requires extensive cleanup.

2) Prior to soldering it can be sprayed on surfaces near the soldering site to act as a heat shield to protect them from excess torch heat and sparks.

3) Due to the fact that firefighting agent has the capacity to cool materials much more rapidly than water alone, it can be used to cool piping and block heat transfer along pipes during and after soldering.

4) After the soldering has been completed, it can be used as an agent to detect any leaks in the newly soldered joint.

In this embodiment, the quantities of nearly all the ingredients other than water have been significantly reduced as compared to the embodiments described above tailored to Class A and Class B usage. This is primarily due to two factors. 1) in this application, the firefighting agent is unlikely to be used with any sort of education system that will dilute the product with water. Because it will mostly likely be used undiluted, the ingredients do not need to be present in such high concentrations. 2) Due to the small nozzle diameter and low pressure of most hand pump sprayers, a low viscosity is strongly preferred for this particular embodiment of the invention so that the hand sprayer can create a proper spray pattern.

Example 4. Firefighting agent for use in fire prevention applications: The exemplary composition shown in Table 4 below has been demonstrated to be effective for fire prevention applications.

TABLE 4

Firefighting agent for fire prevention applications.

| wt.% | component |
|---|---|
| 0.05-0.06 | xanthan gum |
| 3.22-3.71 | boric acid |
| 4.95-5.69 | borax (10 mol) |
| 0 | propylene glycol |
| 88.75-90.08 | water |
| 0.47 | ammonium lauryl sulfate |
| 1.02 | decyl glucoside |
| 0.20-0.31 | citric acid |

The firefighting agent of the present invention is also very effectively used as a retardant to prevent the outbreak and spread of a fire. This application may be used by homeowners to spray vulnerable areas of their property in the event of a wildland fire. It can also be used in proximity to utility poles and equipment in vulnerable areas to prevent the outbreak of wildland fires. In circumstances that poses a risk of fire outbreak such as use of power tools, or machinery near combustible materials or in areas where pallets or boxes are often stacked, the firefighting agent can be used as a retardant to prevent the outbreak of fires.

The shear thinning effect of xanthan gum allows for the agent to better adhere to vertical and even overhead surfaces, and form a more durable film over the surface of the target material.

In this particular embodiment the propylene glycol or other sugar alcohol is not needed. There is no need or desire for foam for this particular usage, and without any flame present, there should be no need break the vapor barrier.

In this particular embodiment, the surfactants serve as wetting agents, which allow the fluid mixture to have better contact with the target surface and better penetrate and soak porous surfaces. This has a powerful fire-retardant effect as it allows the borates to permeate the target material rather than simply forming a thin surface coat. This is not only more effective as a retardant, but it also prevents that borates from immediately washing away in a light rain.

Example 5. Firefighting agent for use in organic farming applications: The exemplary composition shown in Table 5 below can be particularly effective for organic farming applications.

TABLE 5

Firefighting agent for use in a certified organice facility.

| wt.% | component |
|---|---|
| 0.30-0.35 | xanthan gum |
| 2.38-3.53 | boric acid |
| 4.34-5.48 | borax (10 mol) |
| 10.00 | glycol |
| 76.14-78.00 | water |
| 1.56-2.00 | ammonium lauryl sulfate |
| 1.92-2.40 | decyl glucoside |
| 0.15-0.74 | Citric acid |

All of the ingredients in the firefighting agent as described above are not only widely recognized as safe and non-toxic, but also can even be sourced organically with the single exception of propylene glycol. For any of the above uses, in an organic circumstance, propylene glycol can be replaced with glycerol alcohol (glycerin) and meet the commonly accepted criteria for organic standards, even acquiring an OMRI certification.

Example 6. Firefighting agent for use in class K (kitchen) applications: The exemplary composition shown in Table 6 can be particularly effective for class K applications.

TABLE 6

Firefighting agent for use in Class K Fire Suppression.

| wt.% | component |
| --- | --- |
| 0.36-0.45 | xanthan gum |
| 0.00-2.83 | boric acid |
| 0.00-4.34 | borax (10 mol) |
| 10.00 | propylene glycol |
| 71.33-77.90 | water |
| 1.56-8.06 | ammonium lauryl sulfate |
| 1.92-10.06 | decyl glucoside |
| 0.10-0.74 | citric acid |

Many prior art Class K fire suppression agents are very caustic and dangerous to eyes and mucous membranes. Additionally, they are often fine powders that travel long distances and require extensive and costly cleanup after use. Because the inventive firefighting agent is NSF listed and NFPA shown to be effective against Class B fires (which include kitchen grease fires) it makes and excellent replacement for currently used class K fire suppression agents. As used in kitchen fire suppression systems, this embodiment would likely be used undiluted although it could be blended with water.

In Class B and K fires, when the target material is a burning liquid, (such as burning kitchen grease) the formation of a robust and durable foam is the key factor in extinguishing the fire. If the foam breaks down into a non-aerated liquid, the greater density of this liquid will cause it to sink below the surface of the burning fuel, this in turn allows the fuel to continue producing flammable gasses and be exposed to oxygen.

In this particular embodiment, the xanthan gum, propylene glycol, and surfactants facilitate the formation of a more robust and durable foam to prevent oxygen from reaching the fuel surface.

Example 7. Firefighting agent for use in large structure sprinkler systems. The exemplary composition shown in Table 7 can be particularly effective for use in large structure sprinkler systems.

TABLE 7

Firefighting agent for use in in large structure sprinkler systems.

| wt.% | component |
| --- | --- |
| 0.30-0.35 | xanthan gum |
| 2.83-3.53 | boric acid |
| 4.34-5.48 | borax (10 mol) |
| 10.00 | propylene glycol |
| 76.14-77.90 | water |
| 1.56-2.00 | ammonium lauryl sulfate |
| 1.92-2.40 | decyl glucoside |
| 0.15-0.74 | citric acid |

A common problem associated with large structure sprinkler systems is that the large amount of water that is released when a sprinkler is opened causes localized flooding and severe damage to the area around the sprinkler. Another problem is that after stagnantly setting for years in the sprinkler plumbing, the water becomes black, corrodes the plumbing, and breeds microbial contamination. The firefighting agent discloses herein can mitigate all these issues in several ways. First, the firefighting agent is far more effective than water alone at extinguishing fire. Thus, far less quantity of agent needs to be released through the sprinkler which in turn greatly reduces flooding issues. Second, the borates present in the firefighting agent act as natural anti-corrosion agents and antimicrobial agents in aqueous systems. Thus, systems charged with the firefighting agent will be far more stable land less inclined to form the noxious black sludge that is present in many current sprinkler systems.

Example 8. General example of a firefighting agent. The exemplary composition shown in Table 8 is a general utility as a food safe firefighting agent.

TABLE 8

| wt.% | Firefighting agent component |
| --- | --- |
| 75.85 | water |
| 10.00 | propylene glycol |
| 7.00 | borax (10 mol) |
| 2.75 | ammonium lauryl sulfate |
| 4.00 | boric acid |
| 0.40 | xanthan gum |

It is noted that the water used in this example or any of the other examples may be purified by a process such as reverse osmosis (RO). In the case where the firefighting agent is to be used for electrical fires, deionized water may be used to reduce the danger of short-circuiting equipment.

A unique aspect of the firefighting agent described herein is the ease and low cost of manufacturing. It does not require specialized chemicals, hazardous conditions, high temperatures etc. All the ingredients involved are readily available and relatively low in cost. This allows the product to not only be "green" but also commercially viable, two characteristics which are often at odds. The preferred production process is very simple and is also able to be varied as circumstances require. An exemplary process used to produce the firefighting composition is as follows.

1. Optionally, prior to blending as described below, the xanthan gum may be soaked in hot water (about 130° F. to 160° F.) water overnight to enhance mixing 2. Intimately mix boric acid with xanthan gum and citric acid.

3. Mix water and propylene glycol (if used) together and heat this mixture to a minimum of 130° F. and a maximum of 190° F.

4. Slowly add all dry ingredients to hot water while continuously stirring to ensure complete dissolution.

5. Stir in Decyl Glycoside and Ammonium Lauryl Sulfate. Gentle stirring will ensure that there is not excessive foaming.

This production process ensures that a homogeneous stable product is produced without worry of ingredient decomposition, excessive foaming, or clumping. The order and method of making the mixture can vary significantly while still producing the same desired product blend. It is noted that each of the individual constituents can be present in amounts from the minimum disclosed herein to the maximum disclosed herein.

The firefighting agent described herein has several advantages over prior art compositions. The firefighting agent combines various technologies to fight all three legs of the fire triangle by 1: Producing a durable foam that blocks oxygen from reaching fires, 2: Employs wetting agents for better penetration and cooling capacity, 3: Includes fire retardant borates which chemically inhibit fuel combustion.

All three of these methods of action are accomplished without the use of toxic or environmentally harmful chemicals.

The product's safety has been attested to by its NSF listing and its efficacy for both class A and class B fires by its NFPA listing. Additionally, various embodiments of the invention can be used to: fight Class A fires, fight Class B fires, be used where AFFF suppressants are needed, fight Class K fires, replace water in large structure sprinkler systems, act as fire retardant to prevent out-break of fires in high risk areas, used as a suppressant and retardant where only OMRI registered products are allowed, used as a retardant and suppressant where only NSF listed products are allowed, and used in plumbing and soldering applications.

In a standardized NFPA Class A fire test, the firefighting agent was able to completely extinguish the "crib" of burning lumber well within the allotted time and volume requirements to pass the test.

In a standardized NFPA Class B fire test, the firefighting agent was able to completely extinguish the burning heptane, well within the allotted time and volume requirements to pass the test.

The firefighting agent has been listed by NSF international as safe for use in a kitchen environment due to its low toxicity and relative safety of long-term exposure. As used herein, the term "food safe" generally refers to this property of being safe to use on food processing equipment and surfaces.

When sprayed on dead foliage or lumber, the firefighting agent quickly absorbs into the fiber of the material and even after the material thoroughly dries it remains very difficult to ignite and has great difficulty sustaining combustion. This effect and be observed even months after the initial application.

The foregoing has described firefighting agent compositions and methods for their use. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A composition for a firefighting agent comprising: water, xanthan gum, and a surfactant; and
   wherein boric acid is present in an amount of 1.67 to 4 weight percent.

2. The composition of claim 1 wherein the surfactant is selected from the group consisting of ammonium lauryl sulfate, decyl glucoside, sodium lauryl sulfate, potassium lauryl sulfate, sodium palmate, potassium palmate, and combinations thereof.

3. The composition of claim 1 wherein the surfactant is selected from the group consisting of ammonium lauryl sulfate, decyl glucoside, and combinations thereof.

4. The composition of claim 3 wherein ammonium lauryl sulfate is present in an amount from 0.47 to 8.06 weight percent.

5. The composition of claim 3 wherein decyl glucoside is present in an amount from 1.02 to 10.06 weight percent.

6. The composition of claim 1 wherein the xanthan gum is present in an amount from 0.01 to 1 weight percent.

7. A composition for a firefighting agent comprising: water, xanthan gum, and a surfactant; and wherein borax is present in an amount from 2.55 to 7.0 weight percent.

8. A composition for a firefighting agent comprising: water, xanthan gum, a surfactant, boric acid, and borax, wherein a molar ratio of the boric acid to the borax is from approximately 1:1 to approximately 10:1.

9. The composition of claim 8 wherein a molar ratio of the boric acid to the borax is from approximately 3:1 to 6:1.

10. The composition of claim 8 wherein a molar ratio of the boric acid to the borax is approximately 4:1.

11. The composition of claim 1 further comprising a sugar alcohol in an amount up to 10 weight percent.

12. The composition of claim 1 further comprising propylene glycol in an amount from 3.75 to 10 weight percent.

13. The composition of claim 1 further comprising glycerin in an amount of approximately 10 weight percent.

14. The composition of claim 1 further comprising citric acid in an amount from 0.15 to 1.92 weight percent.

15. A firefighting agent composition consisting essentially of, by weight percent: 0.01-1 xanthan gum, 1.67-4 boric acid, 2.55-7 borax, and 0.47-4.03 ammonium lauryl sulfate, balance water and optionally further containing at least one of decyl glucoside, citric acid and sugar alcohol.

16. The composition of claim 15 further comprising decyl glucoside in an amount of up to 5.03 weight percent and citric acid in an amount of up to 1.92 weight percent.

17. The composition of claim 15 further comprising a sugar alcohol in an amount up to 10 weight percent.

18. The composition of claim 15 wherein the xanthan gum is present in an amount from 0.05 to 0.4 weight percent.

19. A composition for a firefighting agent consisting essentially of: xanthan gum, boric acid, borax, a surfactant, and water; wherein the boric acid is present in an amount of 1.67 to 4 weight percent.

20. The composition of claim 19 wherein the surfactant is selected from the group consisting of ammonium lauryl sulfate, decyl glucoside, sodium lauryl sulfate, potassium lauryl sulfate, sodium palmate, potassium palmate, and combinations thereof.

21. The composition of claim 20 wherein ammonium lauryl sulfate is present in an amount from 0.47 to 8.06 weight percent.

22. The composition of claim 19 wherein the xanthan gum is present in an amount from 0.01 to 1 weight percent.

23. A composition for a firefighting agent consisting essentially of: xanthan gum, boric acid, borax, a surfactant, and water; wherein the borax is present in an amount from 2.55 to 7.0 weight percent.

24. The composition of claim 23 wherein a molar ratio of the boric acid to the borax is from approximately 1:1 to approximately 10:1.

25. The composition of claim 23 wherein a molar ratio of the boric acid to the borax is from approximately 3:1 to 6:1.

26. The composition of claim 23 wherein a molar ratio of the boric acid to the borax is approximately 4:1.

* * * * *